(12) United States Patent
Bieber

(10) Patent No.: US 7,882,250 B2
(45) Date of Patent: Feb. 1, 2011

(54) DEVICE FOR PROVISION OF ROLE-BASED ACCESS TO DATA THROUGH A CENTRAL INTERFACE

(75) Inventor: Jüergen Bieber, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 1178 days.

(21) Appl. No.: 10/535,036

(22) PCT Filed: Sep. 29, 2003

(86) PCT No.: PCT/DE03/03237

§ 371 (c)(1),
(2), (4) Date: May 12, 2005

(87) PCT Pub. No.: WO2004/046958

PCT Pub. Date: Jun. 3, 2004

(65) Prior Publication Data

US 2006/0015567 A1  Jan. 19, 2006

(30) Foreign Application Priority Data

Nov. 15, 2002 (DE) ............ 102 53 385

(51) Int. Cl.
G06F 15/16 (2006.01)
(52) U.S. Cl. ............ 709/229; 709/219
(58) Field of Classification Search ........... 709/219
See application file for complete search history.

(56) References Cited

U.S. PATENT DOCUMENTS

| | | | | |
|---|---|---|---|---|
| 5,369,570 A | * | 11/1994 | Parad | 705/8 |
| 5,966,695 A | * | 10/1999 | Melchione et al. | 705/10 |
| 6,611,839 B1 | * | 8/2003 | Nwabueze | 707/101 |
| 7,020,697 B1 | * | 3/2006 | Goodman et al. | 709/223 |
| 2002/0022987 A1 | * | 2/2002 | Mahmood et al. | 705/10 |
| 2002/0095399 A1 | * | 7/2002 | Devine et al. | 707/1 |
| 2002/0156904 A1 | * | 10/2002 | Gullotta et al. | 709/229 |
| 2002/0169858 A1 | | 11/2002 | Bellinger et al. | |
| 2002/0169876 A1 | * | 11/2002 | Curie et al. | 709/226 |
| 2002/0188584 A1 | * | 12/2002 | Ghannam et al. | 707/1 |
| 2003/0149608 A1 | * | 8/2003 | Kall et al. | 705/8 |
| 2003/0172371 A1 | * | 9/2003 | Offenmuller | 717/120 |
| 2004/0162887 A1 | * | 8/2004 | Dillon et al. | 709/217 |
| 2004/0230328 A1 | * | 11/2004 | Armstrong et al. | 700/83 |
| 2005/0007249 A1 | * | 1/2005 | Eryurek et al. | 340/511 |

OTHER PUBLICATIONS

"UNIX Desktop Integration in the Thin Client/Server Based Environment", WWW.THINCLIENT.NET, (Online), Apr. 22, 2001, Retrieved from the Internet: URL: http://web.archive.org/web/20010422055352/ http://www.thinclient.net/technology/unix_integration.htm>, retrieved on Feb. 4, 2004, pp. 1-2, XP002269082.

Andreas Sayegh, "CORBA Standard, Spezifikation, Entwicklung", 2nd Edition, 1999, Content, pp. 5-6, Köln, Germany, BOOK.

* cited by examiner

Primary Examiner—Bunjob Jaroenchonwanit

(57) ABSTRACT

A device for provision of access to data in various data sources. In one embodiment the device permits a user uniform central access to all data sources and a uniform visualization of the data from the corresponding data sources. The various data sources are automation devices, ERP devices, MES devices and other production relevant data sources.

1 Claim, 2 Drawing Sheets

DEVICE FOR PROVISION OF ROLE-BASED ACCESS TO DATA THROUGH A CENTRAL INTERFACE

CROSS REFERENCE TO RELATED APPLICATIONS

This application is the U.S. National Stage of International Application Ser. No. PCT/DE2003/003237, filed Sep. 29, 2003 and claims the benefit thereof. The International Application claims the benefits of German application No. 10253385.7 filed Nov. 15, 2002, both applications are incorporated by reference herein in their entirety.

FIELD OF THE INVENTION

The invention relates to a device for the provision of access to data in various data sources.

SUMMARY OF THE INVENTION

In an enterprise numerous different systems or devices are used for planning and implementing, for example, a production. So-called ERP (Enterprise Resource Planning) devices, MES (Maintenance Execution System) devices and automation devices will be referred to here as examples. ERP devices and MES devices are generally used for preparing and planning production. The automation systems are used directly in the production field for controlling, regulating and monitoring a production plant.

To enable a user to gain access to the data stored in the various devices or data sources, according to the prior art each data source used in an enterprise generally provides its own, separate interface for accessing the data contained in the data source concerned. Therefore, if a user requires, for example, data from the automation device, the automation device ensures access to the data stored therein via a separate interface. For access to data of the ERP device, said device makes available its own interface.

It follows directly from the foregoing that the different production-relevant data in an enterprise can currently be accessed only in a distributed manner. Consequently, a user must have available very numerous applications and installations to be able to gain access to the various data sources. Furthermore, according to the prior art it is not possible to combine the data of different data sources with one another and thereby to make possible an overview of the production-relevant data of the enterprise. In addition, because of the distributed access to the different data sources, different links, passwords and the like must be administered for the individual data sources. According to the prior art, therefore, it is not possible to satisfy the increased requirement for information, evaluations and visualizations of production-relevant data of an enterprise held in different devices.

Starting from this consideration, it is the object of the present invention to create a novel device for providing access to data in various data sources.

This object is achieved by the claims.

According to the invention the device includes means that make possible uniform access to all data sources and uniform visualization of the data in the corresponding data sources.

The data sources are an automation device and/or an ERP device and/or an MES device and/or another data source containing production-relevant data.

According to an advantageous development of the invention, the means make possible role-based access to the data in the various data sources in such a way that, for one or more users, a uniform, central access to data sources predetermined for the user concerned, and a visualization predetermined for the user concerned, are ensured.

A polling device that is freely configurable by users is preferably present for acquiring data cyclically from different data sources and evaluating it such a way that upon attainment of a criterion configurable by users a corresponding message is automatically produced and a corresponding visualization is automatically generated and made available to the or each user.

Preferred developments of the invention are apparent from the dependent claims and from the following description.

BRIEF DESCRIPTION OF THE DRAWINGS

A preferred exemplary embodiment of the invention—which is not limited thereto—is elucidated in more detail below with reference to the drawings, in which.

DETAILED DESCRIPTION OF THE INVENTION

Figure 1:
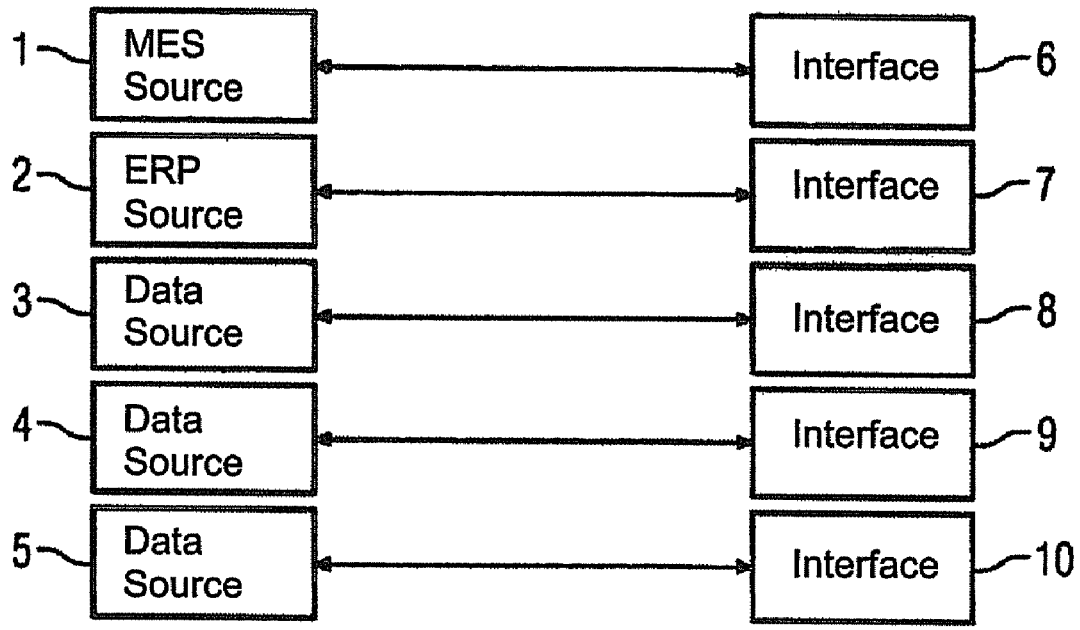
FIG. 1 is a block diagram to clarify the prior art.

FIG. 1 shows in highly schematized form the access to data contained in various data sources commonly used in the prior art. FIG. 1 shows a total of five data sources 1, 2, 3, 4 and 5. The data source 1 is preferably a so-called Maintenance Execution System (MES) device. Data source 2, by contrast, is preferably an ERP device, also referred to as an Enterprise Resource Planning device. Data source 3 may be an automation device, for example, an SPC control system. Data source 4 may be, for example, a database containing historical production data. Data source 5 is preferably a database containing customer-specific data. It is self-evident that numerous other data sources may be present in an enterprise. The data sources 1 to 5 enumerated here represent only one exemplary selection of production-relevant data sources.

According to the prior art each of the data sources 1 to 5 provides a separate interface 6, 7, 8, 9 and 10. Each of the interfaces 6 to 10 is an interface specific to the corresponding data source 1 to 5. For each of the interfaces 6 to 10 a user who wishes to gain access to data in the respective data source requires a separate password, separate software and the like. According to the prior art, therefore, the data sources 1 to 5 are accessed in a distributed manner.

Figure 2:
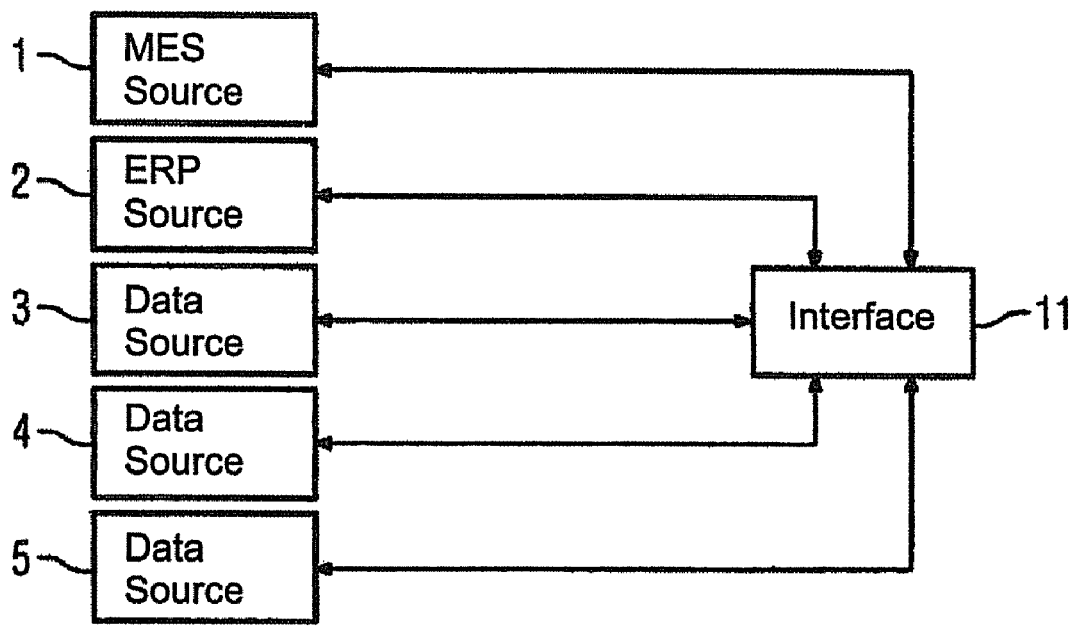
FIG. 2 is a block diagram to clarify the principle underlying the invention.

According to the invention a device for providing access to the data in the various data sources 1 to 5 is provided which makes possible uniform, central access to all the data sources 1 to 5. For this purpose the device includes means, in particular an interface 11, with which a user can gain uniform and central access to all the various data sources 1 to 5. According to the invention, therefore, a so-called "single point of access" to all the data sources present in an enterprise is created (see FIG. 2).

Figure 3:
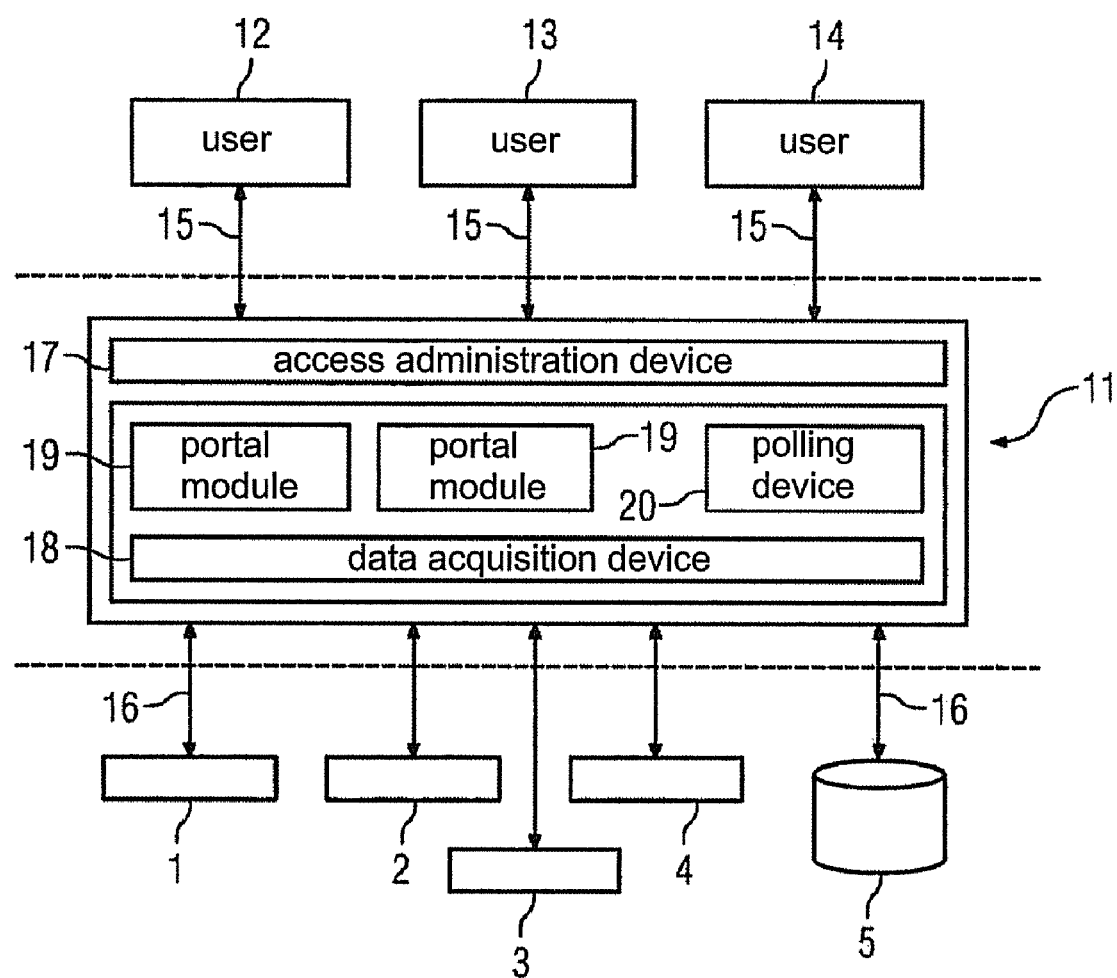
FIG. 3 is a block diagram to clarify the operation of the device according to the invention for providing access to data in various sources.

The details of the device according to the invention are elucidated in more detail below with reference to FIG. 3. FIG. 3 shows a plurality of users 12, 13 and 14 who access the data sources 1 to 5. For each user 12, 13 and 14, central and uniform access to all the data sources 1 to 5 is ensured via the interface 11. Because the inventive device for providing access to the various data sources 1 to 5 can therefore be used simultaneously by a plurality of users 12 to 14, said device is configured to be multiuser-capable. In addition, the interface 11 makes possible central access to all production-relevant data in all data sources present in the enterprise.

The interface 11 includes an access administration device 17. This access administration device 17 may also be referred to as a portal framework. The access administration device 17 executes, in particular, password-protected access to the data sources 1 to 5 of the enterprise.

Thus, a user 12, 13 or 14 who for example accesses the interface 11 via an Internet data line 15 or other data line (for example, LAN, WAP) must enter a password before the access administration device 17 allows access to the data sources 1 to 5. Such login passwords are stored in the access administration device 17, and when the device according to the invention is called by one of the users 12 to 14 it is verified in the access administration device 17 whether the password entered by one of the users 12, 13 or 14 matches the password stored in the access administration device 17. Security functions are accordingly performed in the access administration device 17.

In addition, the access administration device 17 ensures role-based access for the or each user 12, 13 and 14 to the data in the various data sources 1 to 5. Role-based access should be understood to mean that the access administration device 17 identifies the user 12, 13 or 14, for example, by means of the password, and on the basis of this identification enables the user to access predetermined data sources while not permitting access to other data sources. It is thereby possible to provide each different user with specific, individual access to all the data sources 1 to 5. For clarification it should be noted that, for example, different process-relevant data is of interest to a management user than, for example, to a service user or a quality assurance user. With the aid of such role-based access to the various data sources 1 to 5, the inventive device therefore makes possible a pre-filtering of the diverse data, which pre-filtering can be defined individually for every possible user.

In addition, the device according to the invention includes a data acquisition device 18. This data acquisition device 18 may also be referred to as a portal Web service. The data acquisition device 18 accesses the various data sources 1 to 5 in a manner controlled by the access administration device 17. For this purpose the data acquisition device 18 is in contact with each of the data sources 1 to 5 and exchanges information with each of the data sources 1 to 5, for example, via an Internet data line 16. If a management user, for example, logs in by entering the corresponding password to the device according to the invention, the access administration device 17 determines the data sources relevant for the management user, for example, the Enterprise Resource Planning data sources and the data source on historical information, and causes the data acquisition device 18 to fetch the corresponding data from the predetermined data sources.

In addition, the device according to the invention includes a visualization device having a plurality of visualization components 19. The visualization components 19 may also be referred to as portal modules. The data fetched by the data acquisition device 18 from the various data sources 1 to 5 is visualized uniformly for one or more of the users 12 to 14 via the visualization components 19. The visualization components 19, implemented on the basis of so-called ASP.NET technology, display preferably data from the various data sources 1 to 5 simultaneously or jointly in a visualization window. Very convenient and simple viewing of all data relevant to production or to the enterprise and manufacture is thereby made possible for the user.

In addition, the device according to the invention includes a polling device 20 that is freely configurable by the users 12 to 14. Such a polling device may also be referred to as a portal agent. With such a polling device it is possible for the users 12 to 14 to acquire and monitor data held in readiness in various data sources 1 to 5 by, for example, cyclical polling, and to evaluate said data in such a way that, upon attainment of a criterion defined by the user 12, 13 or 14, a corresponding message is automatically generated whereby the user 12, 13 or 14 is notified that the criterion has been attained. In this case all the relevant data is preferably assembled in such a way that all the results acquired and assembled in an automated manner by the portal agent are made available and visualized in an automated manner to the user upon next logging in. It is thereby possible by means of the inventive device to define in the background and automatically, without the user being present, production criteria the attainment of which is automatically monitored by the inventive device.

The invention claimed is:

1. A system of the type including multiple functions relating to production, including Enterprise Resource Planning (ERP), maintenance and automation, configured to provide simultaneous access to a plurality of data sources, the data sources stored in various devices, each having a separate interface for accessing the data contained in the data source, the various devices including an automation device, an ERP device, and an MES device, the system comprising:

a central interface device simultaneously accessible by multiple users and in communication with each of the plurality of data sources, wherein the central interface device comprises mechanisms for simultaneously providing a uniform, central, single point of access to predetermined data sources of the plurality data sources, the central interface device comprising:

(a) a restricted access administration device providing role-based access for each of the multiple users, wherein the restricted access administration device identifies a user and, based on a role of the user, enables or restricts access to predetermined data sources;

(b) a data acquisition device controlled by the restricted access administration device and in communication with each of the plurality of data sources, the data acquisition device configured to fetch data from the predetermined data sources as determined by the restricted access administration device based on the role of the user and to assemble the data for the user;

(c) a polling device for cyclically polling the data from the predetermined data sources based on a production criterion defined by the user, wherein the polling device (1) monitors and evaluates the data for attainment of the production criterion, (2) generates a corresponding message indicating to the user when the production criterion has been attained, and (3) assembles and makes available to the user the data relevant to attainment of the production criterion when the user is next logged in to the system; and (d) a visualization device having a plurality of portal modules enabling data fetched from the plurality of data sources to be viewed simultaneously in a visualization window wherein data is visualized uniformly and predetermined for the user based on the role of the user.

* * * * *